(12) United States Patent
Hamilton, II et al.

(10) Patent No.: US 10,769,700 B2
(45) Date of Patent: *Sep. 8, 2020

(54) SYSTEM AND METHOD FOR SEGMENTING ITEMS IN A SHOPPING CART BY CARBON FOOTPRINT

(71) Applicant: INTERNATIONAL BUSINESS MACHINES CORPORATION, Armonk, NY (US)

(72) Inventors: Rick A. Hamilton, II, Charlottesville, VA (US); Ruthie D. Lyle, Durham, NC (US); Paul A. Moskowitz, Yorktown Heights, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 233 days.

This patent is subject to a terminal disclaimer.

(21) Appl. No.: 15/883,283

(22) Filed: Jan. 30, 2018

(65) Prior Publication Data
US 2018/0158127 A1 Jun. 7, 2018

Related U.S. Application Data

(63) Continuation of application No. 14/247,614, filed on Apr. 8, 2014, now Pat. No. 9,947,035, which is a
(Continued)

(51) Int. Cl.
*G06Q 30/02* (2012.01)
*G06Q 30/06* (2012.01)
*G06Q 90/00* (2006.01)

(52) U.S. Cl.
CPC ..... *G06Q 30/0631* (2013.01); *G06Q 30/0222* (2013.01); *G06Q 30/06* (2013.01); *G06Q 30/0601* (2013.01); *G06Q 90/00* (2013.01)

(58) Field of Classification Search
CPC ....................................... G06Q 30/00–30/0284
(Continued)

(56) References Cited

U.S. PATENT DOCUMENTS

| 6,266,649 B1 | 7/2001 | Linden et al. |
| 6,294,997 B1 | 9/2001 | Paratore et al. |

(Continued)

FOREIGN PATENT DOCUMENTS

| GB | 002925 | 8/2006 |
| WO | 2005122020 | 12/2005 |
| WO | 2005086049 | 9/2008 |

OTHER PUBLICATIONS

Laumer, John, "Carbon Calculator for Online Shopping Measures Footprint of E-commerce", May 15, 2008, https://www.treehugger.com/corporate-responsibility/carbon-calculator-for-online-shopping-measures-footprint-of-e-commerce.html, pp. 1-5 (Year: 2008).*

(Continued)

*Primary Examiner* — John Van Bramer
(74) *Attorney, Agent, or Firm* — William Hartwell; Andrew D. Wright; Roberts, Calderon, Safran & Cole, P.C.

(57) ABSTRACT

A method implemented in a computer infrastructure having computer executable code tangibly embodied on a computer readable medium being operable to provide a shopping cart for a shopper, and segment items in the shopping cart based on the carbon footprint associated with each item. Additionally, the method may include displaying substitute or complementary items in the shopping cart for selection by the user to reduce total carbon values, and awarding carbon certificates.

20 Claims, 3 Drawing Sheets

Related U.S. Application Data continuation of application No. 12/276,757, filed on Nov. 24, 2008, now Pat. No. 8,738,432.

(58) Field of Classification Search
USPC .......................................... 705/14.1–14.73
See application file for complete search history.

(56) References Cited

U.S. PATENT DOCUMENTS

| | | |
|---|---|---|
| 7,137,000 B2 | 11/2006 | Hohberger et al. |
| 7,206,753 B2 | 4/2007 | Bancroft et al. |
| 7,400,253 B2 | 7/2008 | Cohen |
| 8,738,432 B2 | 5/2014 | Hamilton, II et al. |
| 9,361,640 B1 * | 6/2016 | Donsbach .......... G06Q 30/0633 |
| 2003/0130910 A1 | 7/2003 | Pickover et al. |
| 2003/0132298 A1 | 7/2003 | Swartz et al. |
| 2003/0144914 A1 | 7/2003 | Gossard et al. |
| 2006/0085152 A1 | 4/2006 | Sugiyama et al. |
| 2006/0089851 A1 | 4/2006 | Silby et al. |
| 2007/0150361 A1 * | 6/2007 | Kreiner ............. G06Q 30/0633 705/80 |
| 2007/0210923 A1 | 9/2007 | Butler et al. |
| 2007/0239552 A1 | 10/2007 | Sundaresan |
| 2007/0255457 A1 | 11/2007 | Whitcomb et al. |
| 2007/0285229 A1 | 12/2007 | Batra et al. |
| 2008/0071646 A1 | 3/2008 | Hodson et al. |
| 2008/0189142 A1 | 8/2008 | Brown et al. |
| 2008/0262920 A1 | 10/2008 | O'Neill et al. |
| 2009/0288606 A1 | 11/2009 | Zimmerman |
| 2010/0052215 A1 | 3/2010 | Emond et al. |
| 2010/0249955 A1 | 9/2010 | Sitton |

OTHER PUBLICATIONS

John Laumer, "Carbon Calculator for Online Shopping Measures Footprint of E-commerce", May 15, 2008 https://www.treehugger.com/corporate-responsibility/carbon-calculator-for-online-shopping-measures-footprint-of-e-commerce.html, pp. 1-5) (Year: 2008).

* cited by examiner

SYSTEM AND METHOD FOR SEGMENTING ITEMS IN A SHOPPING CART BY CARBON FOOTPRINT

FIELD OF THE INVENTION

The present invention generally relates to carbon segmented shopping carts, and more particularly, to a method and system for segmenting items in a shopping cart according to carbon footprint of the items to promote environmental stewardship.

BACKGROUND

As a result of international agreements, it is now necessary in some industries and some geographies, and will become necessary world wide, to account for and pay for the emission of greenhouse gases. Mechanisms for accounting and payment may be required at all levels of commerce. Climate change resulting from greenhouse gas emissions has resulted in international agreements on limiting and reducing such emissions, e.g. the Kyoto agreement.

One method to limit emissions is through "cap and trade" practices. In this practice, entities that create emissions are required to purchase carbon offset certificates from entities that have earned such certificates by reducing, eliminating, or negating emissions. In general, emissions trading is done as a result of legal requirements while carbon offsets are purchased voluntarily. Today, on the European continent, carbon trades at about $30 per ton. In the future, if the United States agrees to limit its emissions, cap and trade is likely to become a requirement in the United States. In addition, with accelerated climate change, total limits or rationing of carbon may be imposed.

On-line shopping carts are ubiquitous. On-line shopping is often related to its physical counterpart. A user traverses a store, examines items, selects some to purchase, places the selected items in the shopping cart and checks out. Generally, these shopping carts are repositories for products that customers plan to purchase.

SUMMARY

In a first aspect of the invention, a method implemented in a computer infrastructure having computer executable code tangibly embodied on a computer readable medium is operable to provide a shopping cart for a shopper, and segment items in the shopping cart based on at least one environmental parameter associated with each item.

In another aspect of the invention, a system comprises at least one of a shopping cart tool configured to provide a shopping cart for a shopper, an item tool configured to provide items for purchase and information about the items for purchase in a shopping cart, a carbon footprint tool configured to determine a carbon footprint associated with an item, an item search tool configured to search for items using at least one search criteria, an item complement tool configured to provide substitute or complementary items which are displayed in the shopping cart for selection by the user, a carbon calculation tool configured to calculate the total weight of carbon for the items placed in the cart, and a carbon offset tool configured to award a carbon offset certificate for items in the cart. Further, the system comprises an item segmentation tool configured to segment items in the shopping cart based on the carbon footprint associated with each item.

In an additional aspect of the invention, a computer program product comprising a computer usable medium having readable program code embodied in the medium is provided. The computer program product includes at least one component operable to provide a shopping cart for a shopper, and segment items in the shopping cart based on the carbon footprint associated with each item. Additionally, the at least one component is operable to segment the items spatially or positionally according to carbon footprint, segment the items by graphical organizers according to carbon footprint, segment the items based upon an additional environmental parameter and visually represent at least one attribute of an item or a group of items in the shopping cart. The environmental parameter may be green category, source, manufacturer, hazard level, recycle features, presence of heavy metals, and contribution to one or more than one greenhouse gas. The at least one attribute may be one or more of carbon footprint, organic, inorganic, or environmental impact.

In a further aspect of the invention, a method comprises providing a computer infrastructure operable to provide a shopping cart for a shopper, and segment items in the shopping cart based on the carbon footprint associated with each item to at least one of segment the items spatially or positionally according to carbon footprint, segment the items by graphical organizers according to carbon footprint, and segment the items based upon an additional environmental parameter selected from the group consisting of green category, source, manufacturer, hazard level, recycle features, presence of heavy metals, and contribution to one or more than one greenhouse gas. Additionally, the computer infrastructure is operable to visually represent at least one attribute of an item or a group of items in the shopping cart, wherein the at least one attribute comprises carbon footprint, organic, inorganic, or environmental impact. Furthermore, the computer infrastructure is operable to at least one of display substitute or complementary items in the shopping cart for selection by the user, assign a weight of carbon associated with each item and assign a carbon offset monetary value to each item, assign a maximum weight of carbon to the shopping cart and calculate the total weight of carbon for the items placed in the cart, provide substitute items of lower carbon weight than those initially placed in the cart, and award carbon offset certificates assigned to items that are renewable resources.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to carbon segmented shopping carts, and more particularly, to a method and system for segmenting items in a shopping cart according to carbon footprint or other environmental parameters of the items to promote environmental stewardship. The present invention provides a system and method to segment items in a shopping cart according to the carbon footprint or other environmental parameters of the items so that the potential purchaser can easily visualize and ascertain the relative environmental impact of each article and can make substitutions or complementary purchases to help reduce adverse affects on the environment, such as to reduce greenhouse gas emissions.

The present invention also provides a system and method to obtain information on environmental parameters or "green" concerns for an item, and to segment the items in the shopping cart based upon one or more of the parameters, such as carbon footprint and/or recyclability. Environmental parameters and the term "green" may refer, although not limited, for purposes of the present invention, to considerations that relate to environmental protection and includes such concerns as the need to save energy, reduce pollutants, reduce carbon emissions and carbon footprints, reduce the use of hazardous materials, and maximize the energy efficiency, recyclability, or biodegradability of products. Exemplary of environmental parameters for which information may be obtained in the present invention include, but are not limited to "green" category, source, "green" manufacturer, hazard level, recycle features, presence of heavy metals, and contribution to one or more than one greenhouse gas. Moreover, the present invention is configured to associate carbon weights or values with items in the shopping cart, calculate the total carbon weight or value, assign a carbon offset monetary value to each item, award carbon offset certificates to items that are renewable resources, and offer and substitute items to reduce the total carbon weight and environmental impact of the items in the cart for purchase.

Implementing the present invention, a versatile and enhanced shopping cart is segmented according to carbon footprint and related parameters that play a role in environmental stewardship. A carbon footprint may be defined, although not limited, for purposes of the present invention as a measure of the impact human activities have on the environment in terms of the amount of greenhouse gases produced, measured in units of carbon dioxide. It is meant to be useful for individuals and organizations to conceptualize their personal (or organizational) impact in contributing to global warming. Greenhouse gases are the gases present in the earth's atmosphere which reduce the loss of heat into space and therefore contribute to global temperatures through the greenhouse effect. When sunlight reaches the surface of the Earth, some of it is absorbed and warms the surface. The Earth's surface is much cooler than the sun, so the surface of the earth radiates at much longer wavelengths than the sun does, peaking in the infrared at about 10 µm. The atmosphere absorbs these longer wavelengths more effectively than it does the shorter wavelengths from the sun. The absorption of this long wave radiant energy warms the atmosphere. Greenhouse gases also emit long wave radiation both upward to space and downward to the surface. The downward part of this long wave radiation emitted by the atmosphere is the so-called "greenhouse effect."

Greenhouse gases are essential to maintaining the temperature of the Earth. However, an excess of greenhouse gases can raise the temperature of a planet. Greenhouse gases are produced by many natural and industrial processes, which currently result in $CO_2$ levels of about 380 ppmv in the atmosphere.

On earth, the most abundant greenhouse gases are, in order of relative abundance: water vapor, carbon dioxide, methane, nitrous oxide, ozone, and CFCs. The most important greenhouse gases are: water vapor, which causes about 36-70% of the greenhouse effect on Earth, carbon dioxide, which causes about 9-26%, methane, which causes about 4-9%, and ozone, which causes about 3-7% of the greenhouse effect on earth. Note that this is a combination of the strength of the greenhouse effect of the gas and its abundance. For example, methane is a much stronger greenhouse gas than $CO_2$, but is present in much smaller concentrations. It is not possible to state that a certain gas causes a certain percentage of the greenhouse effect, because the influences of the various gases are not additive. (The higher ends of the ranges quoted are for the gas alone; the lower ends, for the gas counting overlaps.) Other greenhouse gases include, but are not limited to, nitrous oxide, sulfur hexafluoride, hydrofluorocarbons, perfluorocarbons and chlorofluorocarbons. Carbon dioxide, methane, nitrous oxide and three groups of fluorinated gases (sulfur hexafluoride, HFCs, and PFCs) are the major greenhouse gases and the subject of the Kyoto Protocol, which came into force in 2005.

The carbon footprint is a measure of the exclusive global amount of carbon dioxide ($CO_2$) and other greenhouse gases emitted by a human activity or accumulated over the full life cycle of a product or service. The life cycle concept of the carbon footprint means that it is all-encompassing and includes all possible causes that give rise to carbon emissions. In other words, all direct (on-site, internal) and indirect emissions (off-site, external, embodied, upstream, downstream) need to be taken into account.

Normally, a carbon footprint is expressed as a $CO_2$ equivalent (usually in kilograms or tonnes), which accounts for the same global warming effects of different greenhouse gases (UK Parliamentary Office of Science and Technology POST, 2006). Carbon footprints can be calculated using a Life Cycle Assessment (LCA) method, or can be restricted to the immediately attributable emissions from energy use of fossil fuels. A life cycle assessment (LCA, also known as life cycle analysis, ecobalance, and cradle-to-grave analysis) is the investigation and valuation of the environmental impacts of a given product or service caused or necessitated by its existence.

Equivalent $CO_2$ ($CO_2e$) is the concentration of $CO_2$ that would cause the same level of radiative forcing as a given type and concentration of greenhouse gas. Examples of such greenhouse gases are methane, perfluorocarbons, and nitrous oxide. $CO_2e$ is expressed as parts per million by volume, ppmv. For example, the radiative forcing for pure $CO_2$ is approximated by $RF=\alpha \ln(C/C_0)$ where C is the present concentration, a is a constant, 5.35 and $C_0$ the pre-industrial concentration, 278 ppm. Hence the value of $CO_2e$ for an arbitrary gas mixture with a known radiative forcing is given by $C_0 \exp(RF/\alpha)$ in ppmv. To calculate the radiative forcing for a 1998 gas mixture, IPCC 2001 gives the radiative forcing (relative to 1750) of various gases as: $CO_2=1.46$ (corresponding to a concentration of 365 ppmv), $CH_4=0.48$, $N_2O=0.15$ and other minor gases=0.01 W/m2. The sum of these is 2.10 W/m2. Inserting this into the above formula, $CO_2e=412$ ppmv. The IPCC is the Intergovernmental Panel on Climate Change, a panel established by the United Nations.

Carbon dioxide equivalency is a quantity that describes, for a given mixture and amount of greenhouse gas, the amount of $CO_2$ that would have the same global warming potential (GWP), when measured over a specified timescale (generally, 100 years). Carbon dioxide equivalency thus reflects the time-integrated radiative forcing, rather than the instantaneous value described by $CO_2e$. The carbon dioxide equivalency for a gas is obtained by multiplying the mass and the GWP of the gas. The following units are commonly used:

a) By the UN climate change panel IPCC: billion metric tonnes of $CO_2$ equivalent ($GtCO_2eq$).

b) In industry: million metric tonnes of carbon dioxide equivalents (MMTCDE).

c) For vehicles: g of carbon dioxide equivalents/km (gCDE/km).

For example, the GWP for methane is 21 and for nitrous oxide 310. This means that emissions of 1 million metric tonnes of methane and nitrous oxide respectively is equivalent to emissions of 21 and 310 million metric tonnes of carbon dioxide.

An alternative definition of the carbon footprint is the total amount of carbon dioxide attributable to the actions of an individual (mainly through their energy use) over a period of one year. This definition underlies the personal carbon calculators. The term owes its origins to the idea that a footprint is what has been left behind as a result of the individual's activities. Carbon footprints can either consider only direct emissions (typically from energy used in the home and in transport, including travel by cars, airplanes, rail and other public transport), or can also include indirect emissions (including $CO_2$ emissions as a result of goods and services consumed). Bottom-up calculations sum attributable $CO_2$ emissions from individual actions; top-down calculations take total emissions from a country (or other low-level entity) and divide these emissions among the residents (or other participants in that entity).

Various methods exist for calculating or estimating carbon footprints and may be employed in the present invention. A preferred conventional method is "the low carbon diet calculator." Other conventional methods known to those skilled in the art, or methods which may be developed for calculating or estimated carbon footprints may be employed in the present invention. As just one example, a product that requires transportation over many miles by truck may have a larger carbon footprint than one that does not. Methods for tracking carbon footprints for transported items and associating the footprints with such items are discussed in commonly assigned U.S. application Ser. No. 12/276,845, filed on even date herewith, the disclosure of which is herein incorporated by reference in its entirety.

Any known, conventional, or future methods for calculating or estimating carbon footprint, such as those described above, may be employed in the present invention.

A conceptual tool in response to carbon footprints are carbon offsets, or the mitigation of carbon emissions through the development of alternative projects such as solar or wind energy or reforestation. A carbon offset is a financial instrument representing a reduction in greenhouse gas emissions. Although there are six primary categories of greenhouse gases, carbon offsets are measured in metric tons of carbon dioxide-equivalent ($CO_2e$). One carbon offset represents the reduction of one metric ton of carbon dioxide, or its equivalent in other greenhouse gases.

There are two primary markets for carbon offsets. In the larger compliance market, companies, governments or other entities buy carbon offsets in order to comply with caps on the total amount of carbon dioxide they are allowed to emit. In the much smaller voluntary market, individuals, companies, or governments purchase carbon offsets to mitigate their own greenhouse gas emissions from transportation, electricity use, and other sources. For example, an individual might purchase carbon offsets to compensate for the greenhouse gas emissions caused by personal air travel. Offsets are typically generated from emissions-reducing projects. The most common project type is renewable energy, such as wind farms, biomass energy, or hydroelectric dams. Other common project types include energy efficiency projects, the destruction of industrial pollutants or agricultural byproducts, destruction of landfill methane, and forestry projects. Purchase and withdrawal of emissions trading credits also occurs, which creates a connection between the voluntary and regulated carbon markets. The methods and systems of the present invention may be employed in the larger compliance market or in the voluntary market.

The Kyoto Protocol has sanctioned offsets as a way for governments and private companies to earn carbon credits which can be traded on a marketplace. The protocol established the Clean Development Mechanism (CDM), which validates and measures projects to ensure they produce authentic benefits and are genuinely "additional" activities that would not otherwise have been undertaken. Organizations that have difficulty meeting their emissions quota are able to offset by buying CDM-approved Certified Emissions Reductions. The CDM encourages projects that involve, for example, renewable energy production, changes in land use, and forestry, although not all trading countries allow their companies to buy all types of credit. The systems and methods of the present invention may be employed with any and all systems, methods or mechanisms for earning carbon credits or carbon offsets, such as with CDM-approved Certified Emissions Reductions.

The commercial system has contributed to the increasing popularity of voluntary offsets among private individuals, companies, and organizations as well as investment in clean technologies, clean energy and reforestation projects around the world. Offsets may be cheaper or more convenient alternatives to reducing one's own fossil-fuel consumption.

Carbon offsets have several common features that affect how and where they can be used, including vintage which is the year in which the carbon reduction takes place, source which is the type of project or technology used in offsetting the carbon emissions, and certification regime, which is the system or protocols under which an offset is certified and registered. Any vintage, source or certification regime for carbon offsets may be employed in the systems and methods of the present invention. Exemplary sources of carbon offsets which may be employed include one or more of land-use such as reforestation, afforestation, avoiding deforestation, and soil management, methane abatement, biomass, renewable energy, such as wind power, solar power, hydroelectric power and biofuel, industrial energy efficiency, such as cogeneration plants, replacement of combustion devices with more fuel efficient devices, energy efficient buildings which reduce the amount of energy wasted through efficient heating, cooling or lighting systems, such as compact fluorescent lamps instead of incandescent light bulbs, destruction of industrial pollutants, such as hydrofluorocarbons, and fuel switching.

The systems and methods of the present invention may be employed with any "cap and trade" practice, or practices where entities that create emissions are required to purchase carbon offset certificates from entities that have earned such certificates by reducing, eliminating, or negating emissions. While in general, emissions trading is done as a result of legal requirements while carbon offsets are purchased voluntarily, for purposes of the present invention, the terms may be used to indicate the same function whether required or voluntary.

In embodiments of the invention, methods for tracking carbon values and labeling carbon values for individual items as described in commonly assigned U.S. application Ser. No. 12/276,845, filed on even date herewith, the disclosure of which is herein incorporated by reference in its entirety, may be employed in the present invention. These carbon values may be used in the segmented shopping cart of the present invention for one or more purposes such as: a) to assess a charge for carbon use, b) to suggest lower carbon value substitutes, and c) to award carbon offset certificates for the purchase of low or negative emission products. In addition, with the possibility of accelerated climate change, total limits or rationing of carbon may be imposed. In embodiments of the invention, the shopping cart may total the carbon value of the items in the cart to limit purchases to a preset maximum value.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device, and/or
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
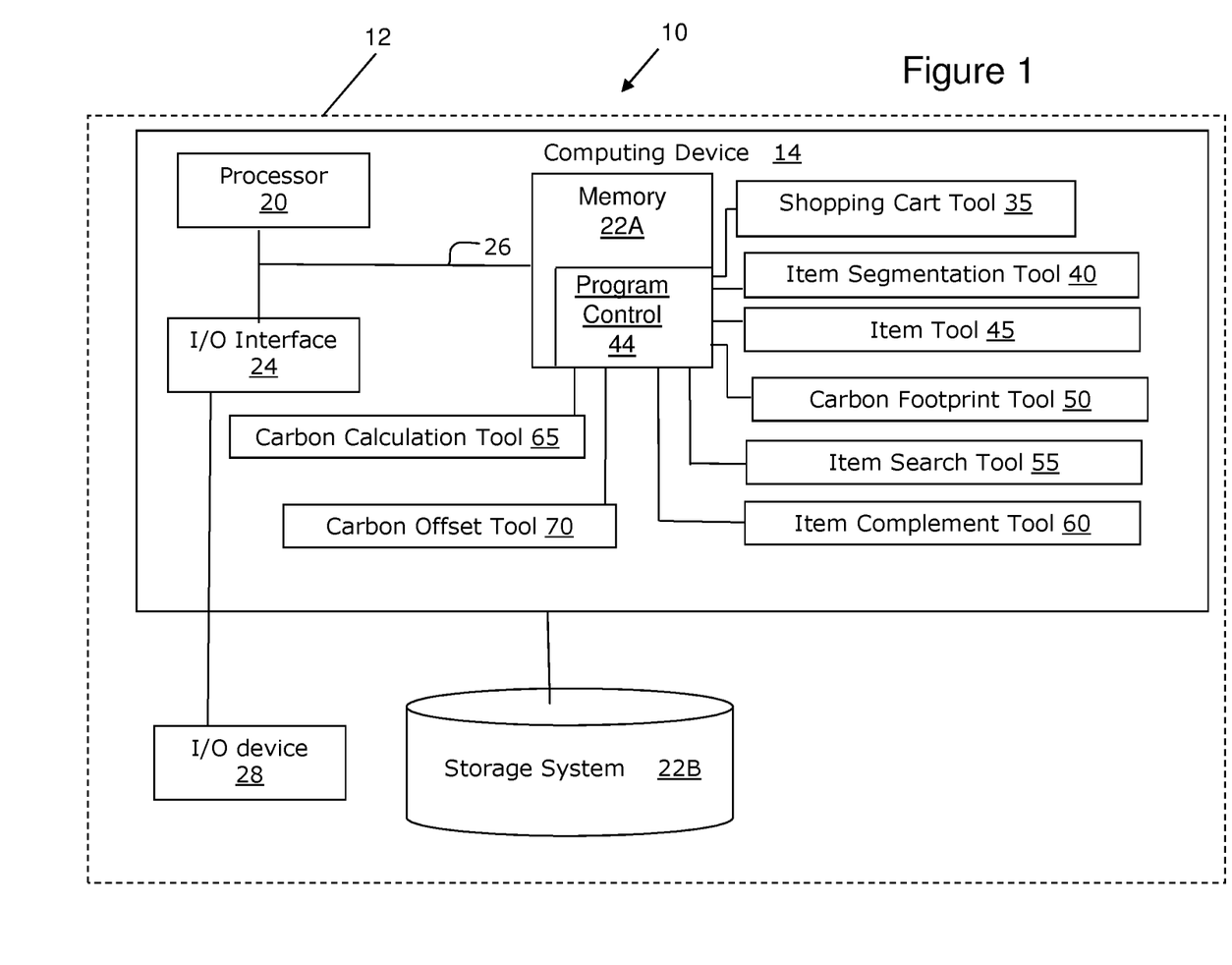
FIG. 1 shows an illustrative environment for implementing steps in accordance with the invention.

FIG. 1 shows an illustrative environment 10 for managing the processes in accordance with the invention. To this extent, the environment 10 includes a computer infrastructure 12 that can perform the processes described herein using a computing device 14. The computing device 14 includes a shopping cart tool 35, an item segmentation tool 40, an item tool 45, a carbon footprint tool 50, an item search tool 55, an item complement tool 60, a carbon calculation tool 65, and a carbon offset tool 70. These tools are configured to and are operable to provide a shopping cart for a shopper, segment items in the shopping cart based on the carbon footprint associated with each item, provide items for purchase and information about the items, determine a carbon footprint associated with an item, search for items using at least one search criteria, provide substitute or complementary items which are displayed in the shopping cart for selection by the user, calculate the total weight of carbon for the items placed in the cart; and award a carbon offset certificate for items in the cart, and display the items in an array or segmented manner on a display device for purchase based on the determined information, e.g., the processes described herein, under control of program control 44.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28. The I/O device 28 can interact with the computing device 14 or any device that enables the computing device 14 to communicate with one or more other computing devices using any type of communications link. The external I/O device/resource 28 may be keyboards, displays, pointing devices, etc. Additionally, in embodiments, the computing device 14 includes a storage system 22B.

The processor 20 executes computer program code (e.g., program control 44) processes on computer media, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Shopping Cart

The shopping cart of the present invention is used in e-commerce to assist people making purchases online, analogous to the American English term "shopping cart." In British English it is generally known as a shopping basket, almost exclusively shortened on websites to "basket." The invention allows online shopping customers to place items in the cart. Upon checkout, the invention as is known to those of skill in the art, typically calculates a total for the order, including shipping and handling (i.e. postage and packing) charges and the associated taxes, as applicable. In addition to performing these functions, the method and system of the present invention segments items in the shopping cart with the segmentation of items being based on the carbon footprint associated with the item(s).

According to an aspect of the invention, the shopping cart tool 35 may provide a shopping cart for a user, shopper or potential purchaser. The system and method of the present invention may be operative to capture a client's or user's payment information, and in the case of a credit card payment rely on a software module of a secure gateway provider, in conjunction with a secure payment gateway, to conduct secure credit card transactions online. In embodiments of the invention, conventional setup may be done in the HTML code of the website, and the shopping cart may be installed on the server which hosts the site, or on a secure server which accepts sensitive ordering information. In embodiments of the invention E-shopping carts may be implemented using HTTP cookies or query strings. In server based implementations, data related to the shopping cart may be kept in the Session object and accessed and manipulated in real-time, as the user selects different items from the cart. Later at the process of commit, the information may be accessed and an order may be generated against the selected item thus clearing the shopping cart.

In embodiments of the invention, the shopping cart may allow for an item to be added to a basket to start a checkout process, and may provide additional features that an Internet merchant uses to fully manage an online store. Data on products, categories, discounts, orders, customers, etc. may be stored in a database and accessed in real time by the invention. The shopping cart may include a storefront component and an administration component. The storefront component may be an area of a Web store that is accessed by visitors to an online shop. Category, product, and other pages (e.g. search, best sellers, etc.) may be dynamically generated by the invention based on information saved in a store database. The administration component may be an area of the Web store that is accessed by the merchant to manage the online shop. The amount of store management features may be changed depending on the sophistication of the shopping cart, but in general a store manager may be able to add and edit products, categories, discounts, shipping and payment settings, etc., and manage orders.

Segmentation of Items

According to an aspect of the invention, an item segmentation tool 40 may segment items in the shopping cart based on the carbon footprint associated with each item. The segmentation may be provided after an item is selected by the user or purchaser for inclusion in the user's cart with the items being presented or displayed for the user with segmentation in the user's cart. In embodiments of the invention, the segmentation may also be provided and displayed for the user before items are selected for inclusion in the user's cart.

In embodiments of the invention, the segmentation, differentiation, or arrangement of the items in the shopping cart may be spatial or positional. For example, the placement of the items may be arranged according to ascending or descending carbon value or carbon footprint vertically or horizontally in the shopping cart or on the display screen. In exemplary embodiments of the invention, low carbon-content items may be placed, segmented, arranged, or displayed on the top, and high carbon-content items may be on the bottom of the shopping cart or display screen.

The segmentation may also be based on folders or icons and other graphical organizers, or by color. For example, low carbon content items may be placed in a low carbon content folder, which is labeled as such or which is assigned a number or numerical range reflecting or representing a low carbon content. In another example, the low carbon content items may be assigned or associated with a low carbon content icon or graphic connoting a healthy or environmentally friendly message, such as a flower or animal, or happy face, or multiples thereof which reflect intensity, or which is assigned a color such as green, or blue or shades thereof. A high carbon content item may be placed in a high carbon content folder, which is labeled as such or which is assigned a number or numerical range reflecting or representing a high carbon content, or which is assigned a color such as red or yellow or shades thereof.

As another example of segmentation in accordance with the present invention, the high carbon content items may be assigned or associated with a high carbon content icon or graphic which connotes an unhealthy or environmentally unfriendly message, such as a dark smokestack, a wilted flower, or multiples thereof which reflect intensity. In embodiments of the invention, segmentation may be by one or more attributes or factors, such as segmentation by both position and by icon.

In addition, the segmentation tool 40 may segment items in the shopping cart by segmentation based on one or more of: "green" category of an item in the shopping cart, source of item, manufacturer, hazard level, recycle features, presence of heavy metals, or contributions to other greenhouse gases, or based on other environmental parameters.

In accordance with the present invention, the visual representation of the shopping cart and/or its goods or items may indicate attributes of items or groups of items. For example, an item with a high carbon content may be placed to the left and colored red. Attributes may be any of: carbon footprint, organic vs. inorganic, environmental impact, and the like.

In embodiments of the invention, the segmentation tool 40 may move items in the shopping cart from one segment to another. For example, if a manufacturer applies a carbon offset, the segmentation tool may move the item to a lower carbon value segment.

The segmentation may be determined by an intelligent agent or segmentation tool 40. For example, the segmentation tool 40 may read carbon values associated with a product or item and then map the values to position in the shopping cart.

In addition, an item tool 45 may be configured to provide items for purchase and information about the items for purchase in the shopping cart. The items may be listed on a manufacturer's or merchant's website or on other websites and selected for inclusion in the shopping cart. Additional information such as "green" information, may be obtained about an item. For example, selecting the item may also give descriptive information, for example by a hyper-link to green information on the website or on the world wide web or Internet. The item tool 45 may also be employed to provide a profile which may be used to specify what characteristics of items are to be displayed. Such information may include information, such as a buyer's desire to see heavy metal content or whether the product can be recycled.

Moreover, a carbon footprint tool 50 may be configured to determine a carbon footprint associated with an item. The carbon footprint may be obtained from a database on the manufacturer's or merchandiser's website, or may be obtained on other websites on the Internet as discussed above. The items may be labeled or prelabeled with a carbon footprint by a manufacturer, or a third party calculator. In embodiments of the invention, the carbon footprint tool 50 may calculate or estimate the carbon footprint by known methods, or as disclosed in the above-mentioned commonly assigned U.S. application Ser. No. 12/276,845, filed on even date herewith, the disclosure of which is herein incorporated by reference in its entirety.

In embodiments of the invention an item search tool 55 may be configured to search for items using at least one search criteria. The search may be conducted in the shopping cart, and/or on the manufacturer's or merchandiser's website in a database of items supplied by the manufacturer or merchandiser or third party, or may be conducted on other websites, or the world wide web, or Internet. Search criteria which may be employed include one or more search criteria, such as "green" category of item, source of item, manufacturer, hazard level, recycle features, presence of heavy metals, contributions to other greenhouse gases, carbon offset points, type or use of item, cost of item, popularity of item, and the like.

In addition, an item complement tool 60 may be configured to provide substitute or complementary items which are displayed in the shopping cart for selection by the user. In embodiments, one or more than one substitute or complementary item can be displayed in the shopping cart, and then purchased automatically. For example, a user may place a product or item in the cart that makes use of a container that can not be recycled and that has a large carbon footprint. The user may ask for one or more complements using the item complement tool 60, and a more green product, or item which can recycled and/or has a smaller carbon footprint appears in the shopping cart in ghost form. The user may select the substitute or complementary item by clicking on the ghost form, and the substitute or complementary item is added to the user's cart and the original item may be removed upon substitution with the substitute item. The placement of substitutes or complements may also be done automatically by the item complement tool 60, without the user asking for complements or substitutes.

Substitute items or complementary items may be obtained from a database on the manufacturer's or merchandiser's website or may be obtained or may be obtained on other websites on the Internet.

In embodiments of the invention, dependencies between items considered for purchase can be made by the consumer, purchaser, or user, so that the consumer can specify that all objects in the set must be purchased together or complements thereof. In this case, the consumer may make a request for complementary items for a set. Similarly, the user can be presented with ghost forms of multiple sets of complementary items. For example, the original set may have included items A, B, and C. Consequently the suggested ghost forms may include one or more than one complementary item set, for example, A', B', and C', and/or A", B", and C", where the potential complementary sets choices are chosen to optimize specified shopping cart conditions.

Moreover, a carbon calculation tool 65 may be configured to calculate the total weight of carbon for the items placed in the cart. The carbon calculation tool 65 may be used to assign a maximum weight of carbon to the shopping cart and calculate the total weight of carbon for the items placed in the cart. A running total weight of carbon may be displayed in the cart. The calculated total weight of carbon may be employed by the user to seek substitute or complementary items for the shopping cart, or to seek carbon offsets. In embodiments of the invention the calculated total weight of carbon may be employed to automatically seek or obtain substitute or complementary items, or carbon offsets for items in the shopping cart. In the case that the maximum weight is exceeded, the invention can automatically seek lower carbon items in an attempt to lower the total weight. The total maximum weight may be based on a single shopping experience or may be an aggregate total over a predetermined amount of shopping experiences or over a predetermined time period.

A carbon offset tool 70 may be configured to award a carbon offset certificate for items in the cart. In embodiments of the invention, a user or customer may make a request to a manufacturer for a carbon offset for an item being considered for purchase using the carbon offset tool 70. The request may be considered in light of previous customer manufacturer relationship information, that is purchase history, if such a relationship has been established. From the manufacturer's perspective providing offsets, like providing coupons, can potentially build a stronger relationship with the customer. From the customer's perspective this allows the segmentation of the shopping cart or movement of objects in the cart to meet carbon restrictions for completion of a potential purchase.

In embodiments of the invention, the carbon offset tool 70 may be employed to designate items for automatic purchase on a pre-specified future date. For example, a user may not wish to buy a high carbon-footprint item now, but will make the purchase in a month because the user plans to initiate some carbon offsets in the coming days.

In addition to assigning a weight of carbon associated with each item, the method and system of the present invention may assign a carbon offset monetary value to each item using the carbon offset tool 70. In addition to providing substitute items of lower carbon weight than those initially placed in the cart, the system may award carbon offset certificates assigned to items that are green using the carbon offset tool 70. For example, in embodiments of the invention green items such as renewable resources, such as items made from recycled and/or recyclable materials may be awarded or assigned a carbon certificate by the carbon offset tool 70.

In embodiments of the invention, a tool may perform one or more functions of another tool, or may employ one or more other tools to perform one or more functions.

The shopping cart of the present invention may be a dynamic entity and employ dynamic items. For example, in some seasons, green issues may be more important than others, so items may possess different or be assigned different carbon offset points depending upon the season.

In embodiments of the invention, the items in a shopping cart may be listed for sale in an on-line auction. Bidding rules may be specified so that the item can be bid for automatically by the shopping cart, or by an intelligent agent linked to the shopping cart.

In general, the shopping cart may be an electronic shopping cart, such as on a web site or otherwise linked to the Internet. In embodiments of the invention, the electronic shopping cart may be associated with a physical shopping cart, and segments goods for physical goods inserted into the physical shopping cart. Items for purchase may be tagged, and their bar codes may be scanned, so that the items are segmented on a display screen on the physical shopping cart or on a display screen at the checkout counter. For example, two items may be compared, such as two cans of different soups, and the items may be segmented according to carbon footprint on the display screen in the physical shopping cart or at the checkout counter. In other embodiments, the shopping cart may be a physical shopping cart which is physically segmented for the classification of goods with a visual or sound indicator or display screen which directs the shopper to place the item in the proper segment based upon carbon footprint. The visual representation of the shopping cart and/or its goods on the display screen, for example, may indicate attributes of items or groups of items for placement in segments in the physical shopping cart. For example, an item with a high carbon content may be placed on the segment of the physical shopping cart as directed by, or depicted on, a display screen on the physical shopping cart.

Exemplary Embodiment

Figure 2:
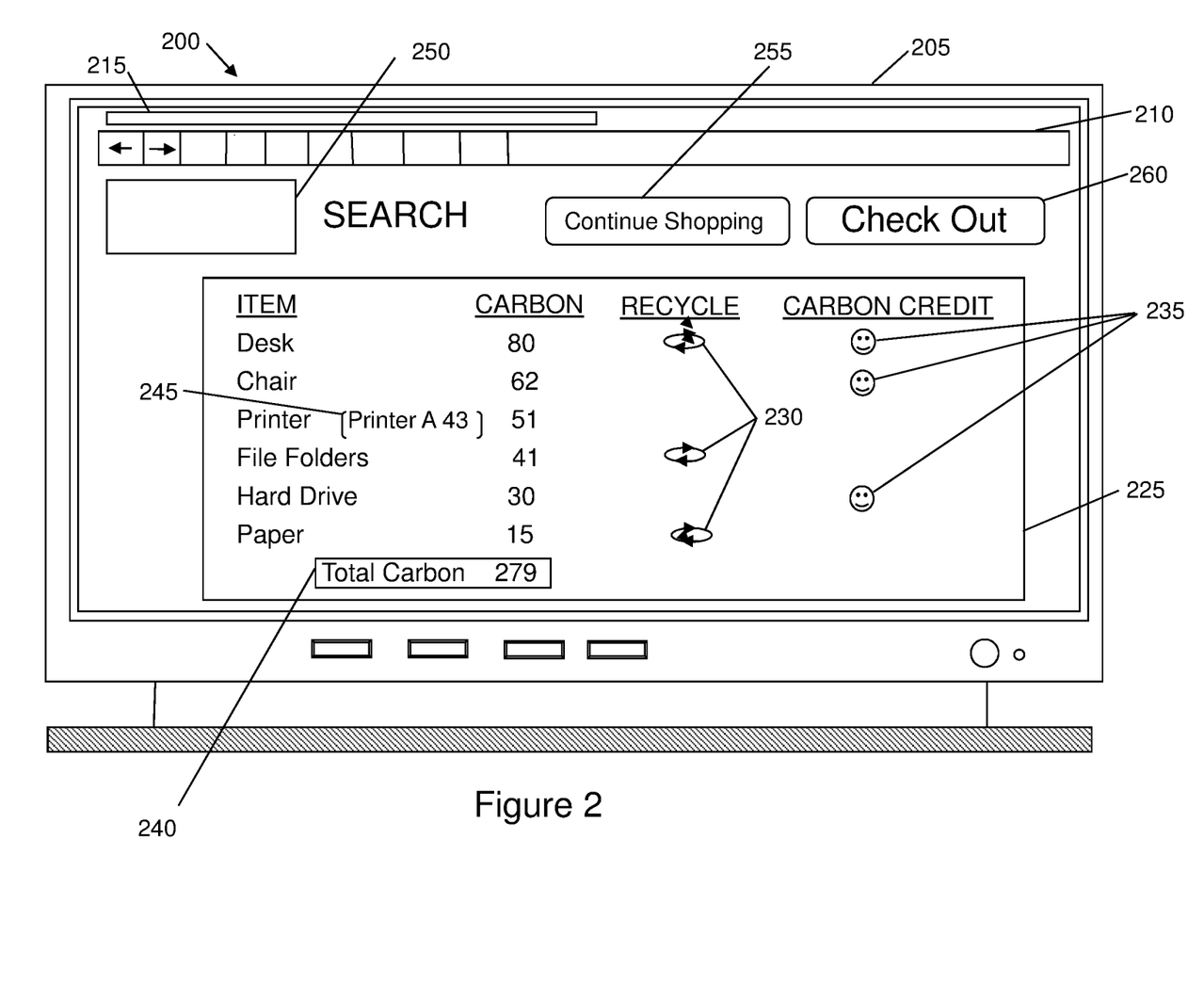
FIG. 2 shows an exemplary carbon segmented shopping cart in accordance with the invention.

FIG. 2 shows an exemplary instance of a carbon segmented shopping cart according to aspects of the invention.

As shown in FIG. 2, a display, such as a computer monitor, 200 shows a website of a manufacturer or merchant having a carbon segmented shopping cart 205 which includes a tool bar 210 for various web browsing, printing, saving, and search functions, and web browser address bar 215.

Additionally, as exemplified in FIG. 2 the shopping cart 205 includes a segmented section 225 where items selected by the user or shopper for potential purchase are segmented according to carbon value. In addition, segmented section 225 may include further segmentation of the items based upon one or more other criteria. For example, as shown in FIG. 2, further segmentation of the items may be based upon whether the items are recyclable by use of a recycle icon or graphic 230 near the carbon value of the item. Also, as shown in FIG. 2, exemplary further segmentation of the items may be based upon whether the items are eligible for a carbon credit by use of a happy face icon or graphic 235 near the carbon value of the item. A total carbon value section 240 is also included in the segmented section 225 showing the calculated total carbon value for all of the selected items listed in segmented section 225.

As shown in FIG. 2, a substitute or complementary item 245 and its carbon value may appear in ghost form next to an item to offer a lower carbon value alternative to the higher carbon value item. The user may click on the substitute or complementary item 245 to substitute and add the substitute item 245 in an appropriate re-segmented position on the segmented item list, and to recalculate the total carbon value in the calculated total carbon value section 240.

Additionally, as shown in FIG. 2, the shopping cart 205 may also include an item search section 250 for input of key words or search criteria for locating items and information on items for purchase. This may be used to perform a search on an item's carbon footprint, etc. The shopping cart 205 may also include a shopping button 255 for continuation of shopping on a previously located website or search result. A check out button 260 for the shopping cart 205 may be provided for completion of shopping and payment for the selected items.

Flow Diagram

Figure 3:
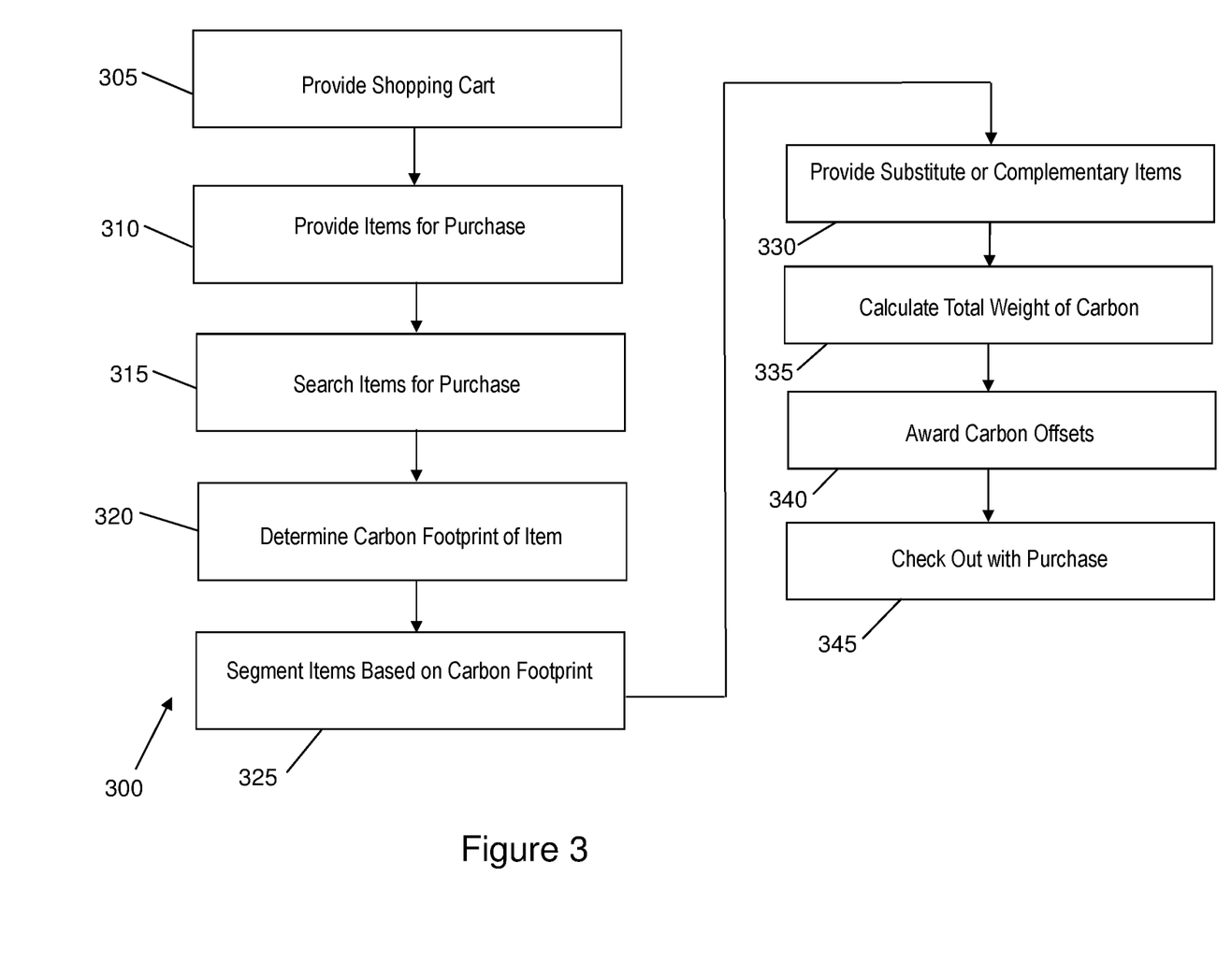
FIG. 3 shows an exemplary flow diagram for implementing aspects of the present invention.

FIG. 3 illustrates exemplary processes in accordance with the present invention. The steps of FIG. 3 may be implemented on the computer infrastructure of FIG. 1, for example. The flow diagram in FIG. 3 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figure. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above.

FIG. 3 shows an exemplary flow 300 for performing steps of the invention. The steps of the flow diagram described herein may be implemented in the environment of FIG. 1.

The flow diagram may equally represent a high-level block diagram of the invention. The steps of the flow diagram may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

As shown in FIG. 3, at step 305, a shopping cart tool provides a shopping cart on a display device for a shopper. At step 310, an item tool provides items for purchase and information about the items for purchase on a portion of the display screen in a shopping cart. The items may be listed on the manufacturer's or merchant's website or on other websites and selected for inclusion in the shopping cart. At step 315, an item search tool may search for items using at least one search criteria, such as manufacturer, or recyclability. The search may be conducted for items in the shopping cart, and/or on the manufacturer's or merchandiser's website or on the internet. At step 320, a carbon footprint tool may determine a carbon footprint associated with an item and forward this information to an item segmentation tool. At step 325, an item segmentation tool segments selected items in the shopping cart based on the carbon footprint associated with each item. At step 330, an item complement tool may provide substitute or complementary items which are displayed in the shopping cart for selection by the user. At step 335, a carbon calculation tool may calculate or determine the total weight of carbon for the items placed or selected for purchase in the cart. At step 340, a carbon offset tool may optionally award a carbon offset certificate for items in the cart. At step 345, the user or purchaser may check out and purchase the selected items.

It should be understood, that while the steps have been described as occurring in a particular order, the invention contemplates that the steps may be performed in other orders, or one or more steps may not be employed, or may be performed more than once. For example, step 335 may occur after step 340, step 315 may be optional, or step 335 may be performed after each of at least one of steps 325, 330, and 340. Furthermore, the invention contemplates that, in embodiments, steps may be implied or omitted while still remaining true to this invention.

Moreover, while the invention has been described using a shopping cart tool 35, an item segmentation tool 40, an item tool 45, a carbon footprint tool 50, an item search tool 55, an item complement tool 60, a carbon calculation tool 65, and a carbon offset tool 70, the invention contemplates that any of the operations performed by the shopping cart tool 35, the item segmentation tool 40, the item tool 45, the carbon footprint tool 50, the item search tool 55, the item complement tool 60, the carbon calculation tool 65, and the carbon offset tool 70 may be performed manually by a user (e.g., a potential purchaser). For example, in embodiments, a user may manually select a substitute or complementary item or manually input a carbon value or carbon offset.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A computer program product for facilitating environmental stewardship in electronic commerce comprising a computer readable storage medium having program instructions embodied therewith, the program instructions executable by a computing device to cause the computing device to:

display an online shopping display screen including a plurality of items selected for purchase by a user in an online shopping cart;
  obtain carbon values associated with each of the plurality of items;
  assign a maximum total weight of carbon for the online shopping cart;
  calculate a total weight of carbon for the plurality of items based on the carbon values;
  determine that the total weight of carbon has exceeded the maximum total weight of carbon;
  based on the determining that the total weight of carbon has exceeded the maximum total weight of carbon, automatically obtain an additional item that is a substitute for one of the plurality of items selected for purchase, wherein a carbon value associated with the additional item is lower than the carbon value associated with the one of the plurality of items; and automatically display on the online shopping display screen, by the computing device, the additional item.

2. The computer program product of claim 1, wherein the program instructions further cause the computing device to segment, on the online shopping display screen the plurality of items selected for purchase based on at least one environmental parameter respectively associated with the plurality of items selected for purchase.

3. The computer program product of claim 2, wherein:
the at least one environmental parameter respectively associated with the plurality of items selected for purchase comprises the carbon values; and
the segmentation of the plurality of items is spatial or positional according to the respective carbon values of the plurality of items selected for purchase.

4. The computer program product of claim 2, wherein:
the at least one environmental parameter respectively associated with the plurality of items selected for purchase comprises the carbon values; and
the segmentation of the plurality of items selected for purchase is by graphical organizers according to the carbon values.

5. The computer program product of claim 2, wherein the at least one environmental parameter is selected from the group consisting of: the carbon values, a green category, a source of the plurality of items, a green manufacturer, a hazard level, recycle features, a presence of heavy metals, and contribution to a greenhouse gas.

6. The computer program product of claim 2, wherein the of the plurality of items selected for purchase are at least one of:
movable from one segment to another upon application of a carbon offset;
dynamic;
searchable using a multitude of search criteria; and
designatable for automatic purchase on a pre-specified future date.

7. The computer program product of claim 1, wherein the plurality of items selected for purchase are physical goods.

8. The computer program product of claim 1, wherein the program instructions further cause the computing device to visually represent at least one attribute of at least one of the plurality of items selected for purchase on the online shopping display screen, wherein the at least one attribute comprises one or more of: the carbon value, an organic impact, an inorganic impact, and an environmental impact.

9. The computer program product of claim 1, wherein the program instructions further cause the computing device to:
receive from the user a selection of the one of the plurality of items selected for purchase; and
based on the selection, display additional information about the selected one of the plurality of items selected for purchase on the online shopping display screen, and displaying a profile specifying what characteristics are to be displayed.

10. The computer program product of claim 1, the displaying the additional item on the online shopping display screen comprises displaying an offer to substitute the additional item for the one of the plurality of items selected for purchase.

11. The computer program product of claim 1, wherein the program instructions further cause the computing device to assign a respective carbon offset monetary value to at least one of the plurality of items selected for purchase.

12. The computer program product of claim 1, wherein the program instructions further cause the computing device to:
determine that at least one item of the plurality of items selected for purchase are renewable resources; and
assign one or more carbon offset certificates to the at least one item.

13. The computer program product of claim 1, wherein the program instructions further cause the computing device to:
compare the carbon value of the additional item to the carbon value of the one of the plurality of items selected for purchase; and
determine that the carbon value of the additional item is lower than the carbon value of the one of the plurality of items selected for purchase.

14. The computer program product of claim 1, wherein steps of claim 1 are provided by a service provider on a subscription, advertising, and/or fee basis.

15. The computer program product of claim 1, wherein the program instructions further cause the computing device to:
receive a selection of the additional item from the user;
add the additional item to the plurality of items selected for purchase; and
remove the one of the plurality of items from the plurality of items selected for purchase.

16. The computer program product of claim 1, wherein the automatically obtaining the additional item comprises obtaining the additional item from a database on a website, and wherein the displaying the additional item comprises automatically substituting the one of the plurality of items with the additional item.

17. The computer program product of claim 1, wherein the program instructions further cause the computing device to:
map the carbon values associated with each of the plurality of items to positions in the online shopping cart; and
graphically arrange the plurality of items in the online shopping cart based on the carbon values.

18. The computer program product of claim 1, wherein the program instructions further cause the computing device to:
determine that one or more of the plurality of items meets a predetermined carbon content range; and
display one or more high carbon content icons in association with one or more of the plurality of items based on the determining that the one or more of the plurality of items meets the predetermined carbon content range.

19. The computer program product of claim 1, wherein the program instructions further cause the computing device to segment on the online shopping display screen the plurality of items selected for purchase based on whether the plurality of items are recyclable.

20. The computer program product of claim 1, wherein the program instructions further cause the computing device to:
determine carbon footprints associated with one or more of the plurality of items selected for purchase by the user in the online shopping cart;
forward the carbon footprints to an item segmentation tool of the computing device; and
segment, by the segmentation tool of the computing device, the online shopping display screen based on the carbon footprints.

* * * * *